US012290216B2

(12) United States Patent
Wei

(10) Patent No.: US 12,290,216 B2
(45) Date of Patent: May 6, 2025

(54) SHOWER DOOR WITH CONCEALED SMALL RAIL SLIDING ASSEMBLY

(71) Applicant: FOSHAN IDEAL CO., LTD., Gaoming Foshan (CN)

(72) Inventor: Wuxiang Wei, Gaoming Foshan (CN)

(73) Assignee: FOSHAN IDEAL CO., LTD., Guangdong (CN)

(*) Notice: Subject to any disclaimer, the term of this patent is extended or adjusted under 35 U.S.C. 154(b) by 149 days.

(21) Appl. No.: 18/027,541

(22) PCT Filed: Sep. 22, 2020

(86) PCT No.: PCT/CN2020/116824
§ 371 (c)(1),
(2) Date: Mar. 21, 2023

(87) PCT Pub. No.: WO2022/061511
PCT Pub. Date: Mar. 31, 2022

(65) Prior Publication Data
US 2023/0380638 A1 Nov. 30, 2023

(51) Int. Cl.
*A47K 3/34* (2006.01)
*E05D 15/06* (2006.01)

(52) U.S. Cl.
CPC ............ *A47K 3/34* (2013.01); *E05D 15/0652* (2013.01); *E05Y 2900/114* (2013.01)

(58) Field of Classification Search
CPC .................................. A47K 3/34; E05F 5/003
(Continued)

(56) References Cited

U.S. PATENT DOCUMENTS 7,346,939 B2 * 3/2008 Perry ........................ A47K 3/34 4/557
10,161,171 B2 12/2018 Lin et al.
(Continued)

FOREIGN PATENT DOCUMENTS

CN 201100064 Y 8/2008
CN 201526235 U 7/2010
(Continued)

OTHER PUBLICATIONS

Second Office Action issued in corresponding Chinese Application No. 202080002248.5 dated Jul. 19, 2023.
(Continued)

*Primary Examiner* — Lauren A Crane
(74) *Attorney, Agent, or Firm* — Harness, Dickey & Pierce, P.L.C.

(57) ABSTRACT

A shower door with a hidden small rail sliding assembly having an upper rail assembly, a sliding assembly, a movable door assembly and a fixed door assembly. The upper rail assembly includes an upper rail and damper triggering members installed on the upper rail. The sliding assembly includes sliding wheels, sliding wheel brackets, a damper, and a damper bracket. The movable door assembly includes a movable door panel and hanging clamps fixed at the top edge of the movable door panel. The upper rail is provided with a top plate, a first baffle plate, and a second baffle plate that are parallel to each other. The bottom surface of the first baffle plate and the bottom surface of the second baffle plate are flush. The sliding assembly, the top edge of the movable door panel and the hanging clamps are integrally contained in the sliding cavity.

10 Claims, 10 Drawing Sheets

(58) Field of Classification Search
USPC .............................................................. 4/607
See application file for complete search history.

(56) References Cited

U.S. PATENT DOCUMENTS

| | | | |
|---|---|---|---|
| 2018/0070779 | A1 | 3/2018 | Minkovich et al. |
| 2018/0320426 | A1 | 11/2018 | Wei |
| 2019/0330895 | A1 | 10/2019 | Lam |
| 2022/0090429 | A1 | 3/2022 | Wei |

FOREIGN PATENT DOCUMENTS

| | | | |
|---|---|---|---|
| CN | 203257273 | U | 10/2013 |
| CN | 208236197 | U | 12/2018 |
| CN | 109339650 | A | 2/2019 |
| CN | 209653727 | U | 11/2019 |
| CN | 111550159 | A | 8/2020 |
| CN | 111566303 | A | 8/2020 |
| DE | 19744894 | B4 | 5/2015 |
| IN | 202596468 | U | 12/2012 |
| IN | 110199077 | A | 9/2019 |
| TW | M498794 | U | 4/2015 |
| WO | 2017128278 | A1 | 8/2017 |

OTHER PUBLICATIONS

Extended European Search Report Corresponding to Application No. 20954365.1, mailed Mar. 18, 2024.

First Office Action issued in corresponding Australian Application No. 2020469890 dated Apr. 6, 2024.

First Office Action issued in corresponding Canadian Application No. 3,188,507 dated May 29, 2024.

International Search Report Corresponding to PCT/CN2020/116824, dated Jun. 18, 2021.

First Office Action issued in corresponding Chinese Application No. 202080002248.5 dated Feb. 14, 2023.

* cited by examiner

SHOWER DOOR WITH CONCEALED SMALL RAIL SLIDING ASSEMBLY

CROSS-REFERENCE TO RELATED APPLICATIONS

This application is a U.S. National Stage Entry of PCT/CN2020/116824, filed Sep. 22, 2020, which is incorporated herein by reference in its entirety.

FIELD

The present application relates to the technical field of sanitary appliances, and in particular to a door opening/closing structure of a shower room.

BACKGROUND

Nowadays, people generally arrange a shower room in a bathroom when decorating houses. A common shower room generally uses a shower door with a glass plate. The existing shower door is generally provided with a linear partition, and an upper rail is mounted at the partition, and one or multiple movable doors which can slide along the upper rail are hung below the upper rail.

At present, a rail is generally mounted on an upper part of the movable door, and a lower part of the rail suspends a movable door panel via a pulley. In order to operate stably and reduce noise, and avoid the strong impact between the movable door panel and the frame or wall, a damper is generally provided on the rail of the shower door. However, the installation of the damper requires increasing the height of the upper rail to hide the installed damper, which inevitably increases the manufacturing cost, and adversely affects the aesthetics of the product. In the case of not increasing the rail height, if the damper needs to be concealed, it is necessary to arrange a hanging clip of the movable door panel below the rail, while the hanging clip will be exposed outside the rail, which also adversely affects the aesthetics of the product.

SUMMARY OF THE PRESENT APPLICATION

Technical Issues

The main technical issue to be addressed by the present application is to provide a shower door with a concealed small-rail sliding assembly aiming at the above disadvantages of the conventional technology.

Solutions to the Issues

Technical Solutions

In order to address the above technical issues, the following technical solutions are provided according to the present application. A shower door with a concealed small-rail sliding assembly is provided according to the present application, including an upper rail assembly, a sliding assembly, a movable door assembly and a fixed door assembly, where the upper rail assembly includes an upper rail and damper triggers mounted on the upper rail, where the upper rail is provided with a top plate, a first cover plate and a second cover plate which are parallel to each other and extend downward from the two opposite sides of the top plate, and a bottom surface of the first cover plate is flush with a bottom surface of the second cover plate; where a first side sliding rail extends horizontally inward from an inner side of the first cover plate, a fixed door panel clamping slot is formed below the first side sliding rail, the bottom of the second cover plate is bent inward to form a horizontal second side sliding rail, and the bottom of the sliding rail surface of the first side sliding rail is higher than the sliding rail surface of the second side sliding rail; where the top plate, the first cover plate and the second cover plate define a sliding cavity, and the whole sliding assembly is accommodated in the sliding cavity; where the sliding assembly includes sliding wheels, sliding wheel brackets, a damper and a damper bracket, where the sliding wheels are mounted at two sides of each sliding wheel bracket, the sliding wheels on a first side of each sliding wheel bracket are in contact with the first side sliding rail, the sliding wheels on a second side of each sliding wheel bracket are in contact with the second side sliding rail, and the sliding wheels on the first side are higher than the sliding wheels on the second side; where the two sliding wheel brackets are respectively connected and fixed at the two opposite ends of the damper bracket, and the damper is accommodated and fixed in a damper accommodating groove of the damper bracket; where the movable door assembly includes a movable door panel and hanging clips fixed at a top edge of the movable door panel, the top edge of the movable door panel and the hanging clips are accommodated in the sliding cavity, and each sliding wheel bracket is connected with the corresponding hanging clip by an adjusting screw.

In a preferred embodiment, each sliding wheel bracket includes a top plate, an adjusting screw hole for fixing the adjusting screw is vertically defined in the middle of the top plate, a third side plate and a fourth side plate are formed by extending downwardly from the two opposite sides of the top plate of the sliding wheel bracket, and a bottom edge of the fourth side plate is higher than a bottom edge of the third side plate; wherein a hanging clip accommodating groove for accommodating the corresponding hanging clip is formed between the third side plate and the fourth side plate, the third side plate and the fourth side plate are each provided with at least one sliding wheel mounting hole perpendicular to the plane of the respective plate, and the respective sliding wheel is mounted at the corresponding sliding wheel mounting hole; where the sliding wheel on the first side is mounted on the fourth side plate, and the sliding wheel on the second side is mounted on the third side plate; where the two opposite ends of the third side plate are each provided with a fixing block, and the fixing block is provided with a fixing block connecting hole.

Further, each hanging clip includes a hanging clip main body located in the middle, an adjusting screw hole is defined in the center of the hanging clip main body, two clipping sheets parallel to each other are arranged on two sides of the hanging clip main body, and each clipping sheet is provided with clipping sheet connecting holes; where a clamping groove is arranged between the two clipping sheets, and the clamping groove is configured to accommodate the top edge of the movable door panel; where the top of the movable door panel is provided with notches, and hanging clip fixing holes are provided on the two outer sides of each notch, each hanging clip main body is located in the corresponding notch with each clipping sheet connecting hole aligned with the corresponding hanging clip fixing hole, and the movable door panel and the hanging clips are fixed by screws passing through the clipping sheet connecting holes and the hanging clip fixing holes; where the adjusting screw passes through the adjusting screw hole on each sliding wheel bracket and is screwed into the adjusting screw hole of each hanging clip to hang the movable door panel.

Further, the damper bracket is a long strip-shaped bracket with a U-shaped cross section, and end portions of two side plates of the damper bracket are each provided with a bracket connecting hole, the fixing block of each sliding wheel bracket extends into the damper accommodating groove of the damper bracket, and the sliding wheel bracket is connected and fixed with the damper bracket by using the screw passing through the bracket connecting hole and the fixing block connecting hole.

In a preferred embodiment, the top plate of the upper rail is provided with adjusting through holes, each of which is used for allowing an adjusting tool to contact with the adjusting screw connecting the respective sliding wheel bracket with the corresponding hanging clip, so as to achieve the installation and height adjustment of the movable door assembly, wherein strip-shaped trigger mounting holes are further defined on the top plate of the upper rail, and the damper triggers are mounted at the trigger mounting holes.

In a preferred embodiment, the damper trigger includes a trigger panel and a trigger table, where the trigger panel is a sheet block provided with panel screw holes, and the trigger table is cuboid with rounded corners provided with trigger table screw holes, where screws passing through the panel screw holes and the corresponding trigger table screw holes for trigger mounting connect the trigger panel with the trigger table and fix the damper trigger on the top plate of the upper rail, where the trigger panel is located outside the top plate of the upper rail, the trigger table extends into the sliding cavity of the upper rail, and is coupled with or separated from a coupling part of the damper as the movable door panel slides.

In a preferred embodiment, the fixed door assembly includes a fixed door panel, a vertical fixed frame and a bottom guide member, where the vertical fixed frame clamps and fixes on a vertical edge of the fixed door panel and is suitable for being fixed on the wall, a top edge of the fixed door panel is clamped and fitted in the fixed door panel clamping slot of the upper rail, and the bottom guide member is located at a corner of the bottom of the fixed door panel away from the vertical fixed frame.

In a preferred embodiment, the bottom guide member is provided with a clamping opening configured to cooperate with the fixed door panel and a guide groove configured to guide the sliding of the movable door panel in a direction parallel to the fixed door panel, where the bottom of the guide groove is provided with a guide member fixing hole.

In a preferred embodiment, the vertical fixed frame includes a vertical frame bottom plate, vertical frame side plates extend from the two opposite sides of the vertical frame bottom plate, and a door panel clamping groove for accommodating and clamping the fixed door panel is formed between the two vertical frame side plates; where the vertical frame bottom plate is provided with vertical frame fixing holes.

In a preferred embodiment, the upper rail assembly further includes fixing seats for fixing the upper rail, where the fixing seat includes a flat top plate provided with screw holes for fixing the fixing seat on the wall; where the side edges and the bottom edge of the top plate of the fixing seat extend toward one side to form limiting plates, and the limiting plates surround an end portion of the upper rail and limit the position of the upper rail; where from the middle of an upper part of the top plate of the fixing seat, extends a bearing table, the top surface of the bearing table is in contact with the top plate of the upper rail, an end of the bearing table is provided with a screw hole, the two opposite ends of the top plate of the upper rail are provided with screw holes for connecting the upper rail with the fixing seats, and an opening is defined on the lower limiting plate of the fixing seat.

Beneficial Effects of the Present Application

Beneficial Effects

As can be seen from the above solution, the upper rail of the shower door with a concealed small-rail sliding assembly provided according to the present application is provided with the top plate, the first cover plate and the second cover plate which are parallel to each other extend downward from two sides of the top plate, the inner side of the first cover plate extends horizontally inward to form the first side sliding rail, the fixed door panel clamping slot is formed below the first side sliding rail, the bottom of the second cover plate is bent inward to form the horizontal second side sliding rail, and the bottom of the sliding rail surface of the first side sliding rail is higher than the sliding rail surface of the second side sliding rail; where the top plate, the first cover plate and the second cover plate define the sliding cavity, and the whole sliding assembly, the top edge of the movable door panel, and the hanging clips are all accommodated in the sliding cavity. The above structure can raise the sliding assembly as much as possible, and the hanging clips on the movable door panel can be raised as much as possible, so that the whole sliding assembly and the hanging clips are concealed in the sliding cavity of the upper rail, which improves the aesthetics of the product. Further, the product has a simple structure, can operate stably and reliably; and there is no need to enlarge and increase the height of the upper rail, which ensures the aesthetics of the product, reduces the overall weight and manufacturing cost of the upper rail, and avoids the waste of resources.

BRIEF DESCRIPTION OF THE DRAWINGS

Description of the Drawings

Figure 1:
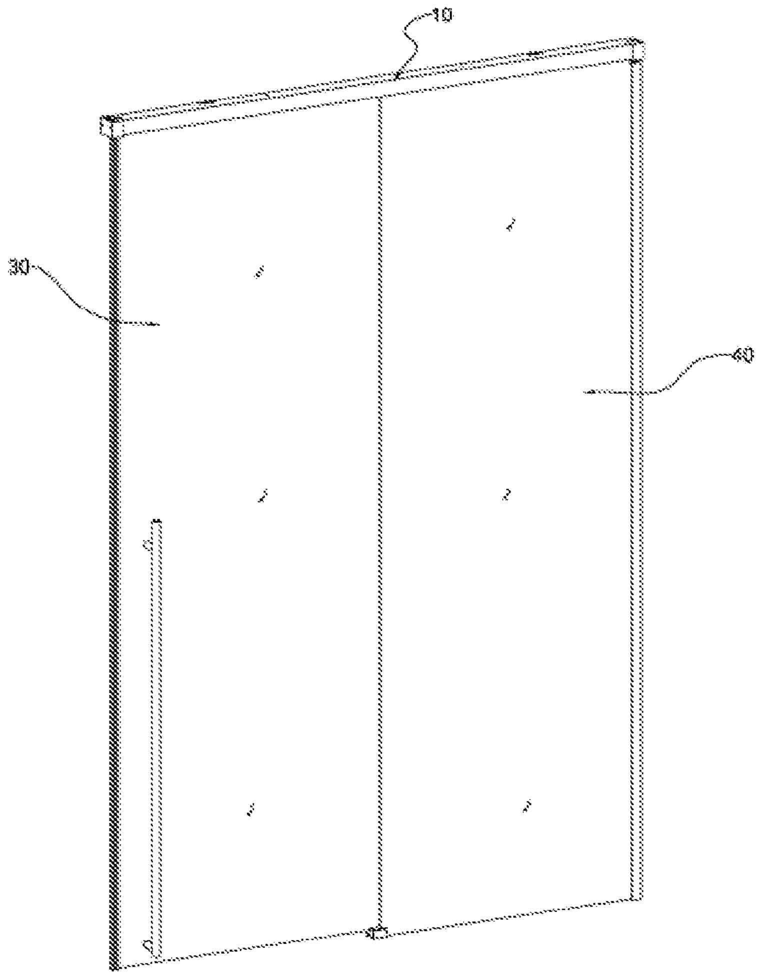
Figure 2:
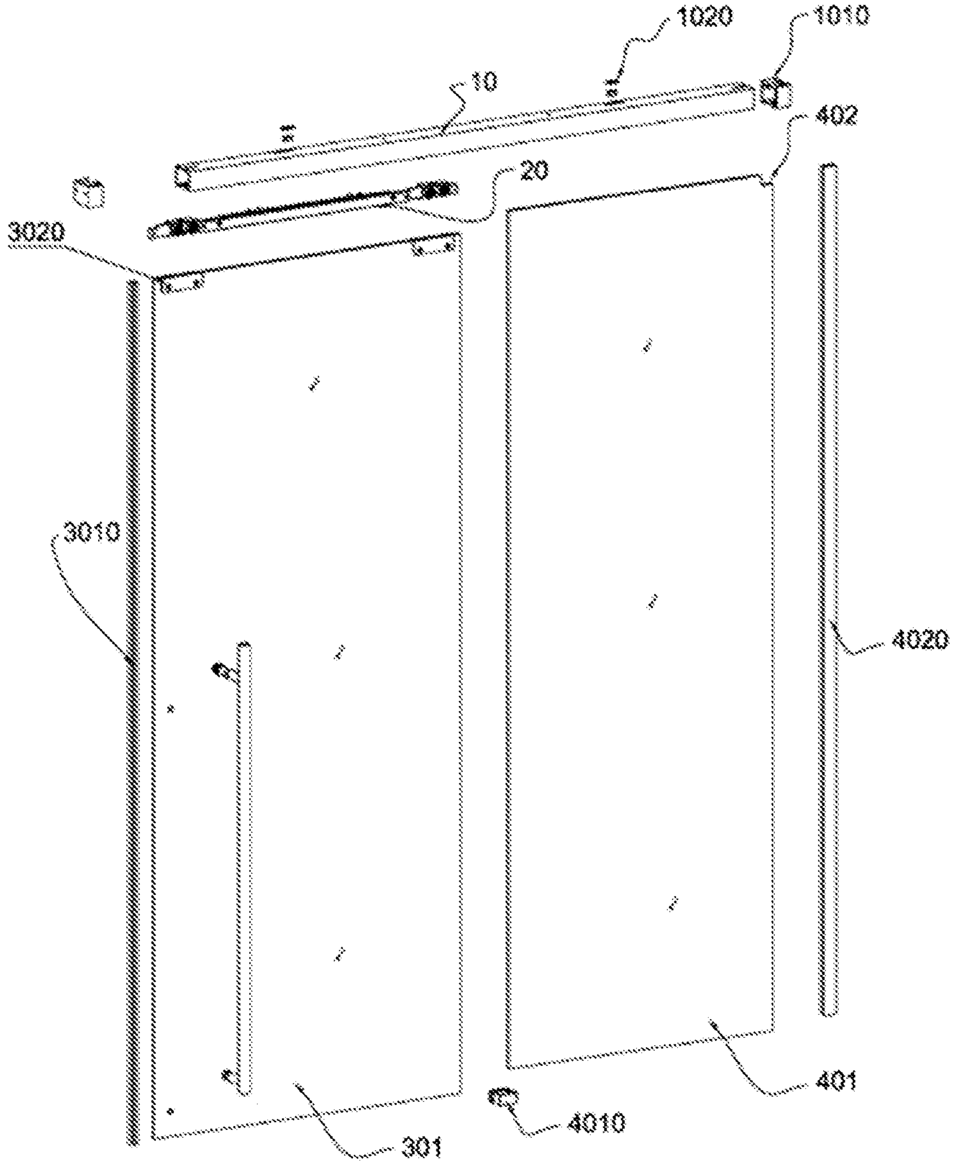
Figure 3A:
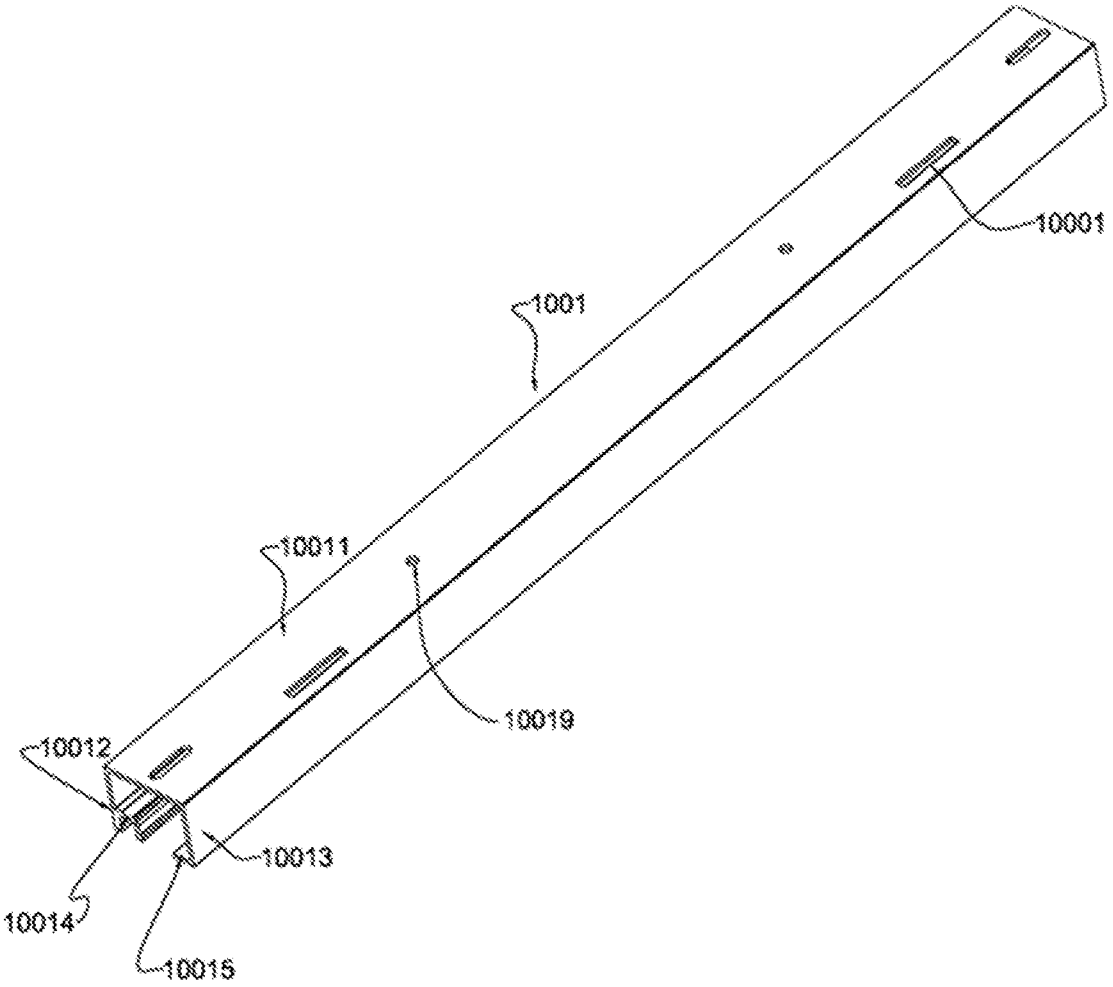
Figure 3B:
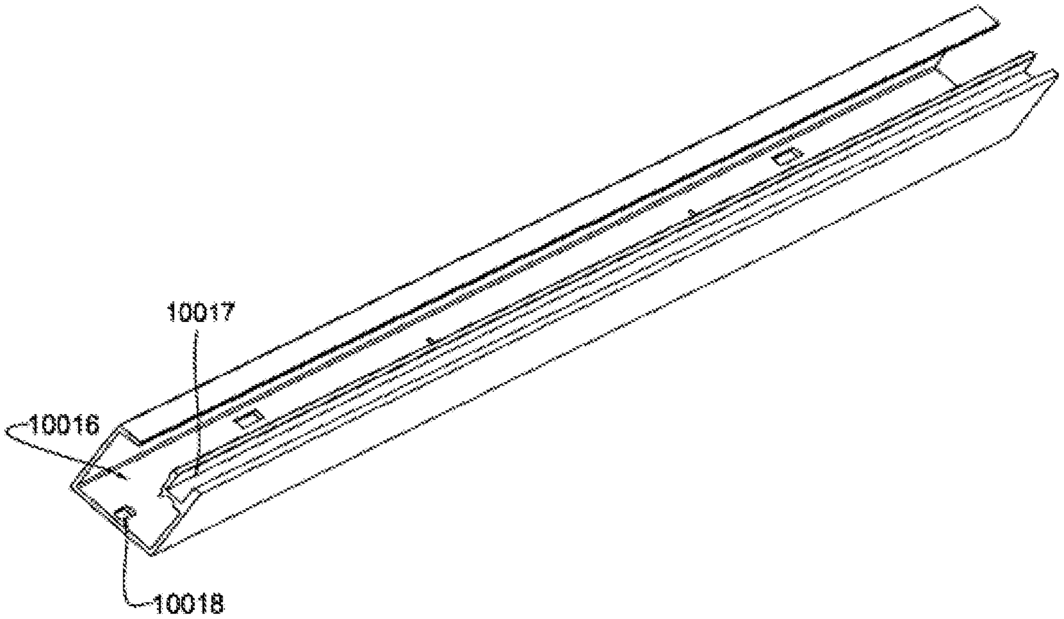
Figure 4A:
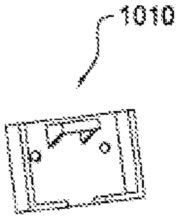
Figure 4B:
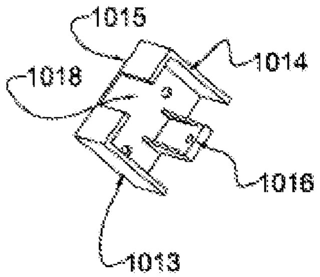
Figure 4C:
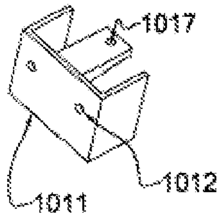
Figure 5A:
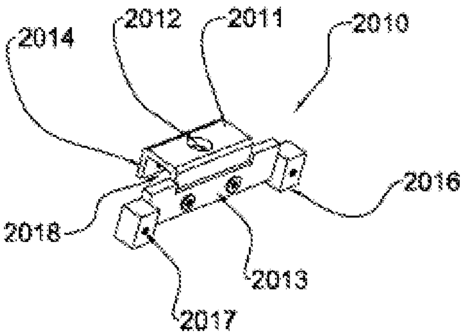
Figure 5B:
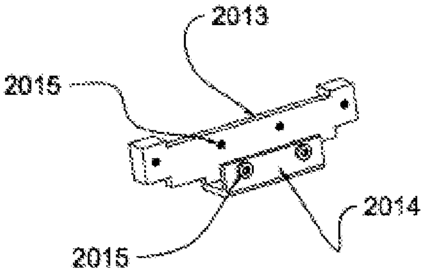
Figure 6A:
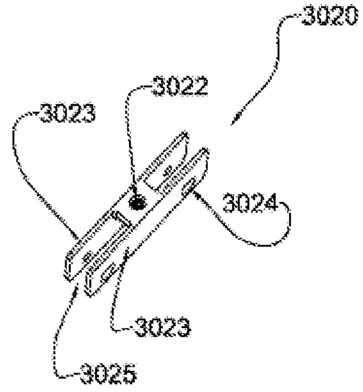
Figure 6B:
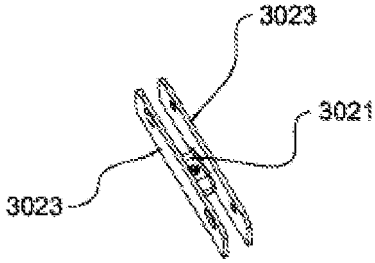
Figure 7:
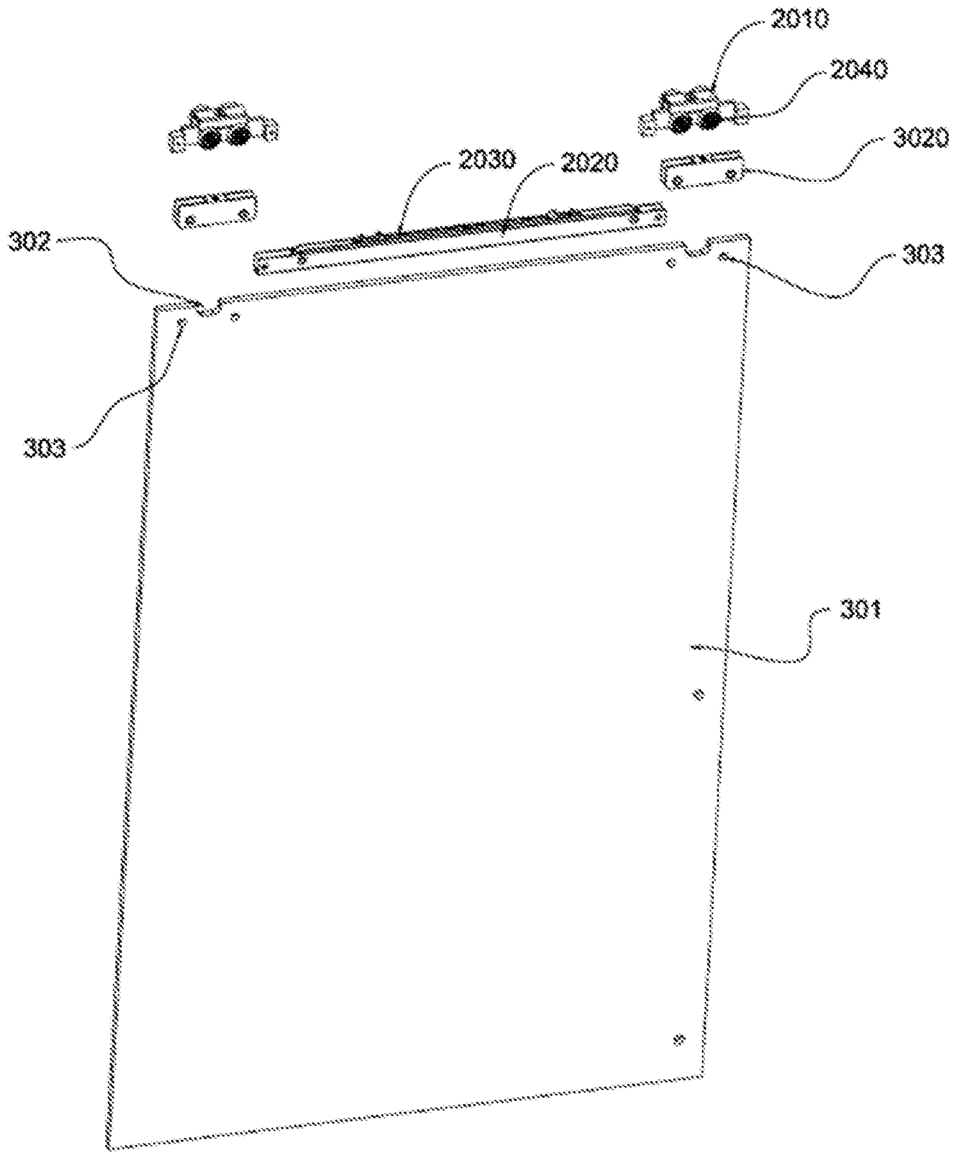
Figure 8:
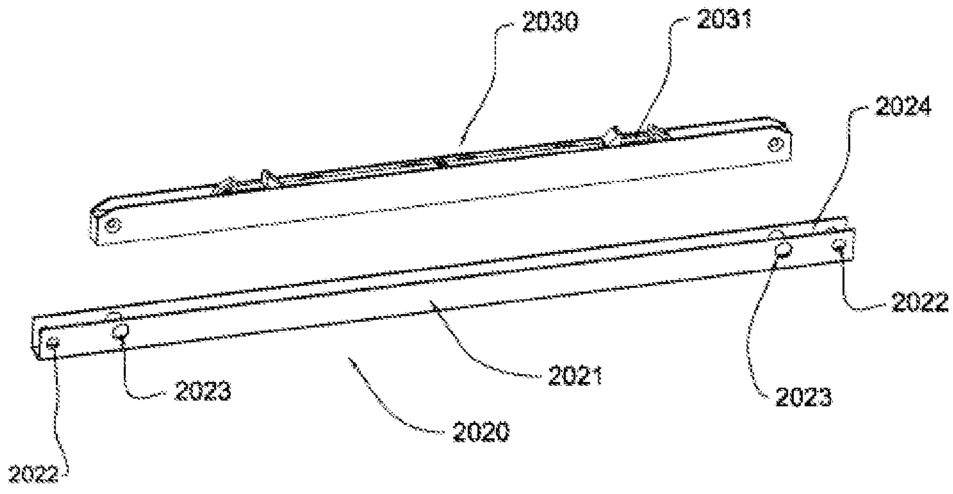
Figure 9:
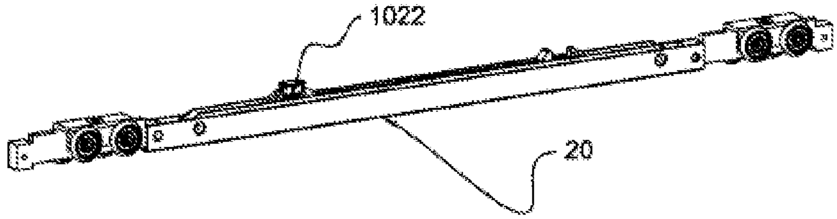
Figure 10A:
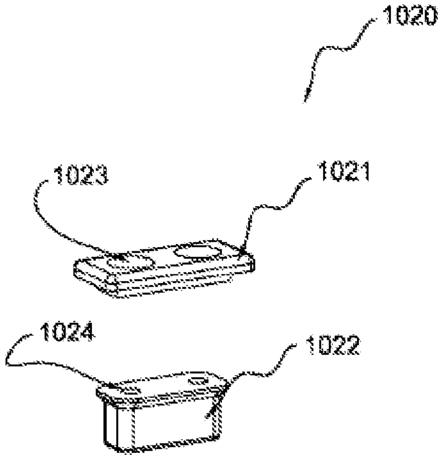
Figure 10B:
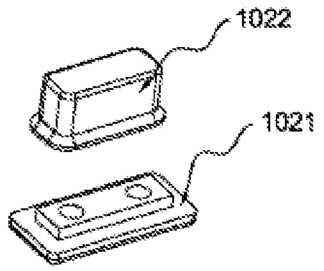
Figure 11:
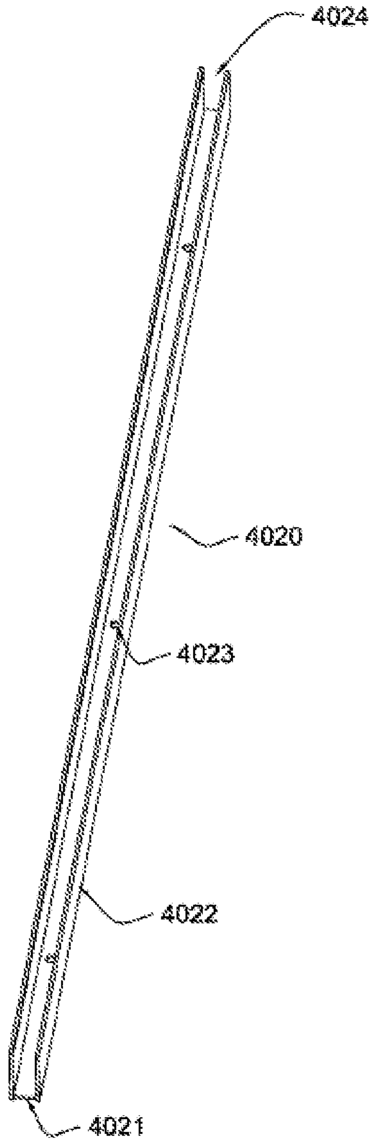
Figure 12A:
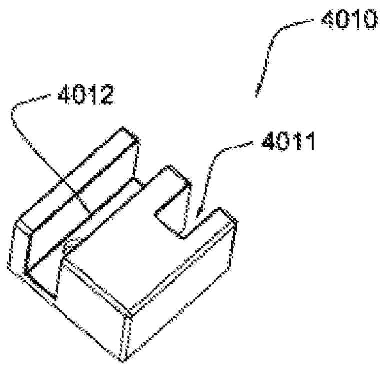
Figure 12B:
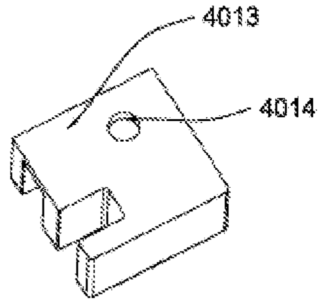

FIG. 1 is a structural view of a shower door with a concealed small-rail sliding assembly according to an embodiment of the present application;

FIG. 2 is an exploded view of the shower door shown in FIG. 1;

FIG. 3*a* is a perspective view of an upper rail of the shower door shown in FIG. 1;

FIG. 3*b* is a perspective view of the upper rail shown in FIG. 3*a* from another perspective;

FIG. 4*a* is a perspective view of a wall seat of the shower door shown in FIG. 1;

FIG. 4*b* is a perspective view of the wall seat shown in FIG. 4*a* from another perspective;

FIG. 4*c* is a perspective view of the wall seat shown in FIG. 4*a* from yet another perspective;

FIG. 5*a* is a perspective view of a sliding wheel bracket of the shower door shown in FIG. 1;

FIG. 5*b* is a perspective view of the sliding wheel bracket shown in FIG. 5*a* from another perspective;

FIG. 6*a* is a perspective view of a movable hanging clip of the shower door shown in FIG. 1;

FIG. 6*b* is a perspective view of the sliding wheel bracket shown in FIG. 5*a* from another perspective;

FIG. 7 is an assembly view of a sliding assembly and a movable door panel of the shower door shown in FIG. 1;

FIG. 8 is an assembly view of a damper and a damper bracket of the shower door shown in FIG. 1;

FIG. 9 is a schematic view showing the cooperation between a damper trigger and the damper of the shower door shown in FIG. 1;

FIG. 10*a* is a schematic view of the damper trigger shown in FIG. 1;

FIG. 10*b* is a schematic view of the damper trigger shown in FIG. 10*a* from another perspective;

FIG. 11 is a perspective view of a vertical frame of the shower door shown in FIG. 1;

FIG. 12*a* is a perspective view of a bottom guide member of the shower door shown in FIG. 1; and FIG. 12*b* is a perspective view of the bottom guide member shown in FIG. 12*a* from another perspective.

EMBODIMENTS

Embodiment of the Present Application

The description paragraphs of the embodiments of the present application are typed in here. Various embodiments of the present application are described in detail hereinafter, where the embodiments are illustrated and described below with reference to the drawings where other elements that have no influence on the scope of the claims of this application are omitted. Although the present application is described with reference to exemplary embodiments, it should be understood that the present application is not limited to these exemplary embodiments. On the contrary, the present application includes not only these embodiments, but also various modifications and improvements.

An embodiment of a shower door with a concealed small-rail sliding assembly of the present application is shown in FIG. 1 and FIG. 2, including an upper rail assembly 10, a sliding assembly 20, a movable door assembly 30 and a fixed door assembly 40. The upper rail assembly 10 includes an upper rail 1001 (see FIG. 3*a*), fixing seats 1010 for fixing two ends of the upper rail 1001 on a fixed structure such as a wall, and damper triggers 1020 mounted on the upper rail 1001.

As shown in FIG. 1 and FIG. 2, the fixed door assembly 40 includes a fixed door panel 401, a vertical fixed frame 4020 and a bottom guide member 4010, where the vertical fixed frame 4020 is fixed on the wall, and the vertical fixed frame 4020 is clamped and fixed on a vertical edge of the fixed door panel 401, where a top edge of the fixed door panel 401 is clamped in a fixed door panel clamping slot 10017 (see FIG. 4) of the upper rail 1001, an upper corner of the fixed door panel 401 against the wall has a notch 402 to avoid a fixing seat 1010 of the upper rail 1001. The bottom guide member 4010 is located at a corner of the bottom of the fixed door panel 401 away from the vertical fixed frame 4020.

As shown in FIG. 3*a* and FIG. 3*b*, the upper rail 1001 is provided with a top plate 10011, a first cover plate 10012 and a second cover plate 10013 which are parallel to each other extend downward from two sides of the top plate 10011, and a bottom surface of the first cover plate 10012 is flush with a bottom surface of the second cover plate 10013. An inner side of the first cover plate 10012 extends horizontally inward to form a first side sliding rail 10014, a fixed door panel clamping slot 10017 is formed below the first side sliding rail 10014, the bottom of the second cover plate 10013 is bent inward to form a horizontal second side sliding rail 10015, where the top plate 10011, the first cover plate 10012 and the second cover plate 10013 define a sliding cavity 10016, and the whole sliding assembly 20 is accommodated in the sliding cavity 10016.

In order to reduce the width of the upper rail 1001, the first side sliding rail 10014 and the second side sliding rail 10015 of the upper rail 1001 are such configured that one side sliding rail is higher than the other side sliding rail, where the fixed door panel clamping slot 10017 is arranged below the higher first side sliding rail 10014, and there is enough space on the side where the lower second side sliding rail 10015 is located to place a damper. The bottom of the sliding rail surface of the first side sliding rail 10014 is higher than the sliding rail surface of the second side sliding rail 10015.

The top plate 10011 of the upper rail 1001 is provided with adjusting through holes 10019 for adjustment of adjusting screws, and a wrench can contact with the adjusting screw (not shown) connecting a sliding wheel bracket 2010 (see FIG. 5*a*) with a hanging clip 3020 (see FIG. 6*a*) through the corresponding adjusting through hole 10019, so as to mount a movable door panel 301 (see FIG. 2) and adjust the height of the movable door panel 301. Strip-shaped trigger mounting holes 10001 are further provided on the top plate 10011 of the upper rail 1001, and each damper trigger 1020 is mounted at the corresponding trigger mounting hole 10001.

As shown in FIG. 4*a* to FIG. 4*c*, each fixing seat 1010 for fixing the upper rail 1001 includes a flat top plate 1011, where the top plate 1011 is provided with screw holes 1012, and the fixing seat 1010 can be fixed on the wall via screws. The side edges and the bottom edge of the top plate 1011 extend toward one side to form limiting plates 1013, 1014 and 1015 which surround an end portion of the upper rail 1001 and limit the position of the upper rail 1001. The middle of an upper part of the top plate 1011 extends to from a bearing table 1016, the top surface of the bearing table 1016 is in contact with the top plate 10011 of the upper rail 1001, an end of the bearing table 1016 is provided with a screw hole 1017, two ends of the top plate 10011 of the upper rail 1001 are provided with screw holes 10018 for connecting the upper rail with the fixing seat, and the upper rail 1001 can be connected and fixed with the fixed seats 1010 by engagement of the screws, the screw holes 1017 and the screw holes 10018 (see FIG. 3*b*). An opening 1018 is defined on the lower limiting plate 1015 of the fixing seat 1010, and the movable door panel 301 can enter the opening 1018 to contact with the wall.

As shown in FIG. 5*a* and FIG. 5*b*, a top plate 2011 of each sliding wheel bracket 2010 is vertically provided with an adjusting screw hole 2012 for mounting the adjusting screw (not shown), so as to hang the movable door panel 301 with the adjusting screw. Two sides of the top plate 2011 of the sliding wheel bracket 2010 extend downward to form a third side plate 2013 and a fourth side plate 2014, and a bottom edge of the fourth side plate 2014 is higher than a bottom edge of the third side plate 2013. A hanging clip accommodating groove 2018 which can accommodate the hanging clip 3020 (see FIG. 6*a* and FIG. 6*b*) on the movable door panel 301 is formed between the third side plate 2013 and the fourth side plate 2014, each of the third side plate 2013 and the fourth side plate 2014 is provided with at least one sliding wheel mounting hole 2015 perpendicular to the plate surface, and a sliding wheel 2040 (see FIG. 7) is mounted at the sliding wheel mounting hole 2015. The sliding wheel 2040 on the third side plate 2013 slides along the sliding surface of the lower second side sliding rail 10015, and the sliding wheel 2040 on the fourth side plate 2014 slides along the sliding surface of the higher first side sliding rail 10014. Two ends of the third side plate 2013 are each provided with a fixing block 2016, and the fixing block 2016 is provided with a fixing block connecting hole 2017, to facilitate the connection of the sliding wheel bracket 2010 to a damper bracket 2020 with screws.

As shown in FIG. 7, the movable door assembly 30 includes the movable door panel 301, hanging clips 3020, and a vertical anti-collision strip 3010 (see FIG. 2), where in order to reduce the size of the upper rail 1001 in the height direction, two notches 302 are defined at the top of the movable door panel 301, and hanging clip fixing holes 303 are provided on two sides of each notch 302. As shown in FIG. 6*a* and FIG. 6*b*, each hanging clip 3020 includes a hanging clip main body 3021 located in the middle, and an adjusting screw hole 3022 is defined in the center of the hanging clip main body 3021. Two clipping sheets 3023 parallel to each other are arranged on two sides of the hanging clip main body 3021, and each clipping sheet 3023 is provided with clipping sheet connecting holes 3024. A clamping groove 3025 is arranged between two clipping sheets 3023, and the clamping groove 3025 is configured to accommodate the top edge of the movable door panel 301. When the hanging clips 3020 are mounted, the hanging clip main body 3021 in the middle of each hanging clip 3020 is located in the corresponding notch 302 at the top of the movable door panel 301, the connecting holes 3024 of the clipping sheets 3023 are aligned with the hanging clip fixing holes 303 of the movable door panel 301, and screws (not shown) are passed through the connecting holes 3024 and the hanging clip fixing holes 303 to fix the movable door panel 301 to the hanging clips 3020. The adjusting screws (not shown) are passed through the adjusting screw holes 2012 of the sliding wheel brackets 2010 and are screwed into the adjusting screw holes 3022 of the hanging clips 2020 to hang the movable door panel 301. When the movable door panel 301 is in a suspended state, the whole hanging clips 3020 are located in the sliding cavity 10016 of the upper rail 1001.

As shown in FIG. 2, FIG. 7 and FIG. 8, the sliding assembly 20 includes sliding wheels 2040, sliding wheel brackets 2010, a damper 2030 and the damper bracket 2020. The sliding wheels 2040 are mounted on sliding wheel brackets 2010, the two sliding wheel brackets 2010 are respectively connected and fixed to two ends of the damper bracket 2020, and the damper 2030 is mounted in damper bracket 2020.

As shown in FIG. 8, the damper bracket 2020 is a long strip-shaped bracket with a U-shaped cross section, and end portions of two side plates 2021 of the damper bracket 2020 are each provided with a bracket connecting hole 2022, the fixing block 2016 of each sliding wheel bracket 2010 extends into a damper accommodating groove 2024 of the damper bracket 2020, and the sliding wheel bracket 2010 is connected and fixed with the damper bracket 2020 by using the screw passing through the bracket connecting hole 2022 and the fixing block connecting hole 2017.

As shown in FIG. 8 and FIG. 9, the damper 2030 is accommodated in the damper accommodating groove 2024 of the damper bracket 2020, two side plates 2021 of the damper bracket 2020 are each provided with damper connecting holes 2023, and the damper 2030 is fixed in the damper accommodating groove 2024 by screws.

As shown in FIG. 10*a* and FIG. 10*b*, each damper trigger 1020 includes a trigger panel 1021 and a trigger table 1022, where the trigger panel 1021 is a sheet block provided with panel screw holes 1023, and the trigger table 1022 is a rounded cuboid provided with trigger table screw holes 1024, where screws passing through the trigger mounting hole 10001 connect the trigger panel 1021 with the trigger table 1022, and fix the damper trigger 1020 on the top plate 10011 of the upper rail 1001, where the trigger panel 1021 is located outside the top plate 10011 of the upper rail 1001, the trigger table 1022 extends into the sliding cavity 10016 of the upper rail 1001, and is coupled with or separated from a coupling part 2031 of the damper 2030 along with the sliding of the movable door panel 301.

As shown in FIG. 11, the vertical fixed frame 4020 of the fixed door panel 401 includes a vertical frame bottom plate 4021, two sides of the vertical frame bottom plate 4021 extend to form vertical frame side plates 4022, and a door panel clamping groove 4024 for accommodating and clamping the fixed door panel 401 is formed between the two vertical frame side plates 4022. The vertical frame bottom plate 4021 is provided with vertical frame fixing holes 4023 to fix the vertical fixed frame 4020 on the wall by screws. In addition, the fixed door panel 401 may also be fixed on the wall by other forms such as hanging clips.

As shown in FIG. 12*a* and FIG. 12*b*, the bottom guide member 4010 is provided with a clamping opening 4011 configured to cooperate with the fixed door panel 401 and a guide groove 4012 configured to guide the sliding of the movable door panel 301 in a direction parallel to the fixed door panel 401, where the bottom 4013 of the guide groove 4012 is provided with a guide member fixing hole 4014.

The above embodiments are only the preferred embodiments of the present application, and more changes can be made to the present application in practical application, as long as the basic object of the present application can be achieved.

INDUSTRIAL APPLICABILITY

The shower door of the present application can be manufactured and applied in industry, so it has industrial applicability.

The invention claimed is:

1. A shower door with a concealed small-rail sliding assembly, comprising an upper rail assembly, a sliding assembly, a movable door assembly and a fixed door assembly, wherein the upper rail assembly comprises an upper rail and damper triggers mounted on the upper rail, wherein the upper rail is provided with a top plate, a first cover plate and a second cover plate which are parallel to each other and extend downward from the two opposite sides of the top plate, and a bottom surface of the first cover plate is flush with a bottom surface of the second cover plate; wherein a first side sliding rail extends horizontally inward from an inner side of the first cover plate, a fixed door panel clamping slot is formed below the first side sliding rail, a top edge of a fixed door panel of the fixed door assembly is clamped and fitted in the fixed door panel clamping slot, the bottom of the second cover plate is bent inward to form a horizontal second side sliding rail, and the bottom of a sliding rail surface of the first side sliding rail is higher than a sliding rail surface of the second side sliding rail; wherein a sliding cavity is defined by the top plate, the first cover plate and the second cover plate, and the whole sliding assembly is accommodated in the sliding cavity, thereby the sliding assembly is raised;

wherein the sliding assembly comprises sliding wheels, sliding wheel brackets, a damper and a damper bracket, wherein the sliding wheels are mounted at two sides of each sliding wheel bracket, the sliding wheels on a first side of each sliding wheel bracket are in contact with the first side sliding rail, the sliding wheels on a second side of each sliding wheel bracket are in contact with the second side sliding rail, and the sliding wheels on the first side are higher than the sliding wheels on the second side; wherein the two sliding wheel brackets are respectively connected and fixed at the two opposite ends of the damper bracket, and the damper is accommodated and fixed in a damper accommodating groove of the damper bracket; and wherein the movable door assembly comprises a movable door panel and hanging clips fixed at a top edge of the movable door panel, the top edge of the movable door panel and the hanging clips are accommodated in the sliding cavity, and each sliding wheel bracket is connected with the corresponding hanging clip by an adjusting screw with the hanging clips on the movable door panel also being raised, so that the whole sliding assembly and the hanging clips are concealed in the sliding cavity.

2. The shower door with a concealed small-rail sliding assembly according to claim 1, wherein each sliding wheel bracket comprises a top plate, a first adjusting screw hole for fixing the adjusting screw is vertically defined in the middle of the top plate, a third side plate and a fourth side plate are formed by extending downwardly from the two opposite sides of the top plate of the sliding wheel bracket, and a bottom edge of the fourth side plate is higher than a bottom edge of the third side plate; wherein a hanging clip accommodating groove for accommodating the corresponding hanging clip is formed between the third side plate and the fourth side plate, the third side plate and the fourth side plate are each provided with at least one sliding wheel mounting hole perpendicular to the plane of the respective plate, and the respective sliding wheel is mounted at the corresponding sliding wheel mounting hole; wherein the sliding wheel on the first side is mounted on the fourth side plate, and the sliding wheel on the second side is mounted on the third side plate; and wherein the two opposite ends of the third side plate are each provided with a fixing block, and the fixing block is provided with a fixing block connecting hole.

3. The shower door with a concealed small-rail sliding assembly according to claim 2, wherein each hanging clip comprises a hanging clip main body located in the middle, a second adjusting screw hole is defined in the center of the hanging clip main body, two clipping sheets parallel to each other are arranged on two sides of the hanging clip main body, and each clipping sheet is provided with clipping sheet connecting holes; wherein a clamping groove is arranged between the two clipping sheets, and the clamping groove is configured to accommodate the top edge of the movable door panel; wherein the top of the movable door panel is provided with notches, and hanging clip fixing holes are provided on the two outer sides of each notch, each hanging clip main body is located in the corresponding notch with each clipping sheet connecting hole aligned with the corresponding hanging clip fixing hole, and the movable door panel and the hanging clips are fixed by screws passing through the clipping sheet connecting holes and the hanging clip fixing holes; and wherein the adjusting screw passes through the first adjusting screw hole on each sliding wheel bracket and is screwed into the second adjusting screw hole of each hanging clip to hang the movable door panel.

4. The shower door with a concealed small-rail sliding assembly according to claim 2, wherein the damper bracket is a long strip-shaped bracket with a U-shaped cross section, and end portions of two side plates of the damper bracket are each provided with a bracket connecting hole, the fixing block of each sliding wheel bracket extends into the damper accommodating groove of the damper bracket, and the sliding wheel bracket is connected and fixed with the damper bracket by using the screw passing through the bracket connecting hole and the fixing block connecting hole.

5. The shower door with a concealed small-rail sliding assembly according to claim 1, wherein the top plate of the upper rail is provided with adjusting through holes, each of which is used for allowing an adjusting tool to contact with the adjusting screw connecting the respective sliding wheel bracket with the corresponding hanging clip, so as to achieve the installation and height adjustment of the movable door assembly, wherein strip-shaped trigger mounting holes are further defined on the top plate of the upper rail, and the damper triggers are mounted at the trigger mounting holes.

6. The shower door with a concealed small-rail sliding assembly according to claim 5, wherein the damper trigger comprises a trigger panel and a trigger table, wherein the trigger panel is a sheet block provided with panel screw holes, and the trigger table is a cuboid with rounded corners provided with trigger table screw holes, wherein screws passing through the panel screw holes and the corresponding trigger table screw holes for trigger mounting connect the trigger panel with the trigger table and fix the damper trigger on the top plate of the upper rail, wherein the trigger panel is located outside the top plate of the upper rail, the trigger table extends into the sliding cavity of the upper rail and is coupled with or separated from a coupling part of the damper as the movable door panel slides.

7. The shower door with a concealed small-rail sliding assembly according to claim 1, wherein the fixed door assembly comprises the fixed door panel, a vertical fixed frame and a bottom guide member, wherein the vertical fixed frame clamps and fixes on a vertical edge of the fixed door panel and is suitable for being fixed on a wall, and the bottom guide member is located at a corner of the bottom of the fixed door panel away from the vertical fixed frame.

8. The shower door with a concealed small-rail sliding assembly according to claim 7, wherein the bottom guide member is provided with a clamping opening configured to cooperate with the fixed door panel and a guide groove configured to guide the sliding of the movable door panel in a direction parallel to the fixed door panel, wherein the bottom of the guide groove is provided with a guide member fixing hole.

9. The shower door with a concealed small-rail sliding assembly according to claim 7, wherein the vertical fixed frame comprises a vertical frame bottom plate, vertical frame side plates extend from the two opposite sides of the vertical frame bottom plate, and a door panel clamping groove for accommodating and clamping the fixed door panel is formed between the two vertical frame side plates; and wherein the vertical frame bottom plate is provided with vertical frame fixing holes.

10. The shower door with a concealed small-rail sliding assembly according to claim 1, wherein the upper rail assembly further comprises fixing seats for fixing the upper rail, wherein the fixing seat comprises a flat top plate provided with screw holes for fixing the fixing seat on a wall; wherein the side edges and the bottom edge of the top plate of the fixing seat extend toward one side to form limiting plates, and the limiting plates surround an end portion of the upper rail and limit a position of the upper rail;

and wherein from the middle of an upper part of the top plate of the fixing seat, extends a bearing table, a top surface of the bearing table is in contact with the top plate of the upper rail, an end of the bearing table is provided with a screw hole, the two opposite ends of the top plate of the upper rail are provided with screw holes for connecting the upper rail with the fixing seats, and an opening is defined on the lower limiting plate of the fixing seat.

* * * * *